US008242640B2

(12) United States Patent
Lee et al.

(10) Patent No.: US 8,242,640 B2
(45) Date of Patent: Aug. 14, 2012

(54) POWER SYSTEM WITH LIGHT-CONTROLLED FUNCTION AND THE CONTROL METHOD THEREOF

(75) Inventors: Yu-Lung Lee, Sihwan (TW); Chun Chuan Chen, Xinzhuang (TW)

(73) Assignee: Powertech Industrial Co., Ltd., Taipei Hsien (TW)

( * ) Notice: Subject to any disclaimer, the term of this patent is extended or adjusted under 35 U.S.C. 154(b) by 373 days.

(21) Appl. No.: 12/588,309

(22) Filed: Oct. 13, 2009

(65) Prior Publication Data

US 2011/0012434 A1 Jan. 20, 2011

(30) Foreign Application Priority Data

Jul. 20, 2009 (TW) ............................... 98124390 A

(51) Int. Cl.
*H01H 35/14* (2006.01)
*G05B 19/00* (2006.01)

(52) U.S. Cl. ........................................ 307/117; 700/259

(58) Field of Classification Search .................. 307/117; 700/258

See application file for complete search history.

(56) References Cited

U.S. PATENT DOCUMENTS

| | | | | |
|---|---|---|---|---|
| 5,386,210 A * | 1/1995 | Lee | .............................. | 340/567 |
| 6,522,078 B1 * | 2/2003 | Okamoto et al. | ............. | 315/149 |
| 2008/0094210 A1 * | 4/2008 | Paradiso et al. | ............... | 340/540 |
| 2008/0148075 A1 * | 6/2008 | Reder | ........................... | 713/300 |

* cited by examiner

*Primary Examiner* — Michael Rutland Wallis

(74) *Attorney, Agent, or Firm* — Rosenberg, Klein & Lee

(57) ABSTRACT

A power system with light-controlled function and the control method thereof, which power system comprising a light sensor module, a first microprocessor, a wireless transmitter, at least one controlled socket, a wireless receiver and a second microprocessor. The light sensor module outputs a first electrical signal according to the brightness of light. The first microprocessor is coupled to the light sensor module and outputs a first control signal according to the first electrical signal. The wireless transmitter is coupled to the first microprocessor and transmits the first control signal to the wireless receiver. The second microprocessor is coupled to the wireless receiver and the aforementioned controlled socket so as to control the state of power supply in the above-said controlled socket according to the first control signal.

16 Claims, 7 Drawing Sheets

POWER SYSTEM WITH LIGHT-CONTROLLED FUNCTION AND THE CONTROL METHOD THEREOF

BACKGROUND OF THE INVENTION

1. Field of the Invention

The present invention relates to a power system with light-controlled function and the control method thereof; in particular, the present invention relates to a power system and the control method thereof which makes determinations in accordance with brightness of environmental light, and according to the determination result, controls power supply to a power socket in a wireless fashion.

2. Description of Related Art

Before using an electrical appliance or electronic device, people usually need to first turn on the light for environmental lighting, and then respectively power on the electrical appliance or electronic device connected to a wall-tapped socket or a socket provided on a power extension line, thus causing inconvenience in using the electrical appliance or electronic device for users. Additionally, after use of the electrical appliance or electronic device, people are always accustomed to simply turn off the light and then directly leave the application location, but may not power off the power supply to the wall-tapped socket or the socket on a power extension line. As such, the electrical appliance or electronic device remains in a standby state, accordingly leading to unnecessary power consumption in the electrical appliance or electronic device operating in the standby state.

Furthermore, upon using the wall-tapped socket and the extension line socket, intense changes in external environment, such as earthquake or outside impact, may occur, which usually causes the user to be unable to immediately turn off the power supply to the electrical appliance or electronic device currently in operation, thus leading to fire disasters endangering lives and properties or undesirable power break events.

SUMMARY OF THE INVENTION

Accordingly, the present invention provides a power system with light-controlled function and the control method thereof, wherein the power system allows the user, after turning on the light, to be capable of using immediately the required electrical appliance or electronic device by means of the light sensor module and application of wireless technology; meanwhile, after turning off the light, it also allows to power off all power supplies so as to achieve the objective of power saving. Besides, the disclosed power system is further enabled to, upon occurrences of environmentally strong changes, turn off the power supply to the electrical appliance or electronic device in operation, thereby successfully achieving the goal regarding to safe usage of electricity.

DETAILED DESCRIPTION OF THE PREFERRED EMBODIMENTS

Figure 1:
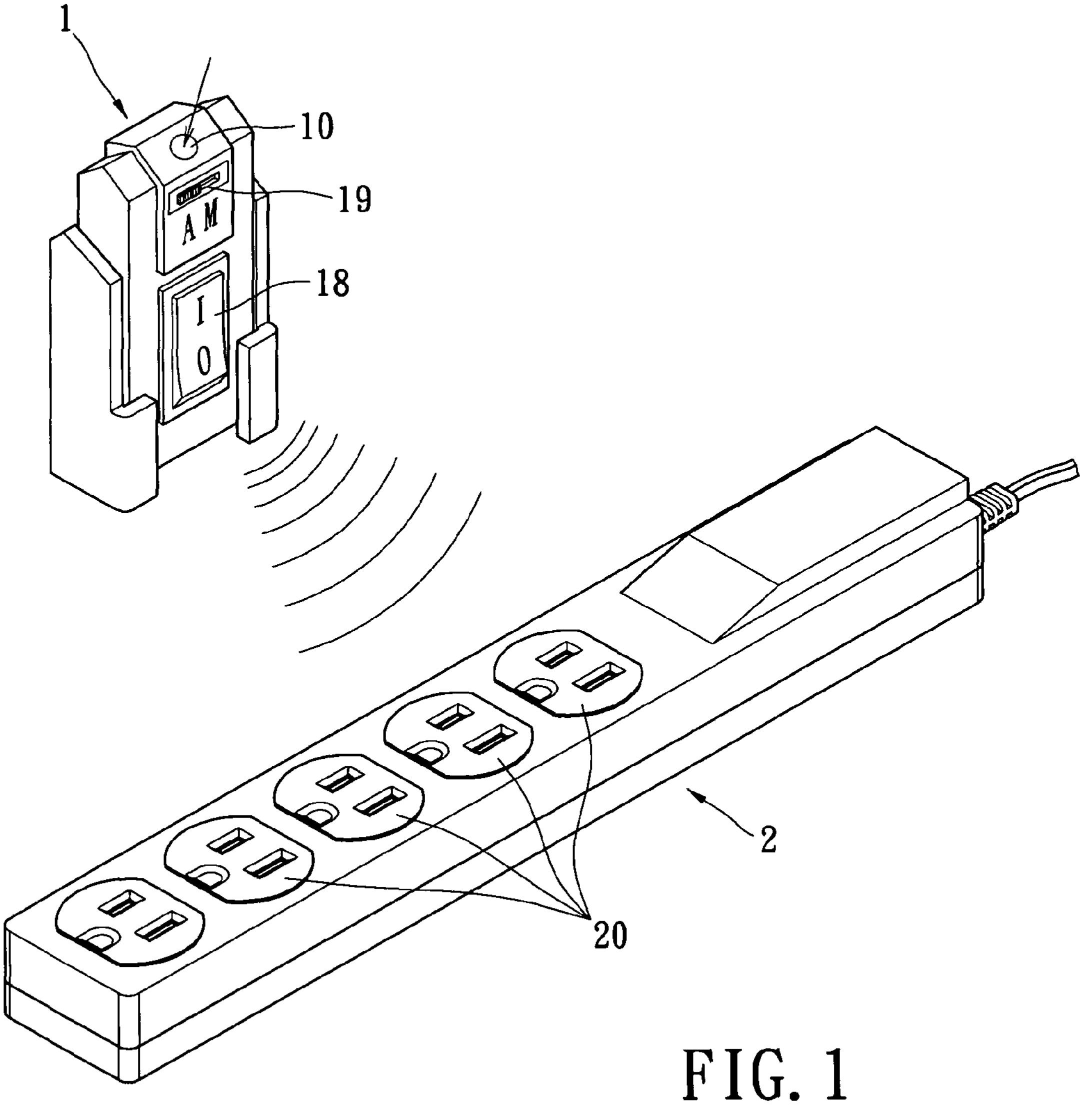
FIG. 1 is an architecture diagram of a first embodiment according to the present invention.

Refer now to FIG. 1, wherein an architecture diagram of a first embodiment according to the present invention is shown. In the Figure, the fundamental architecture of the power system with light-controlled function according to the present invention comprises a remote control device 1 and a power socket device 2. Herein, there on the remote control device 1, a light sensor module 10, a power control unit 18 and a mode selection unit 19 are provided. In addition, at least one controlled socket 20 is provided on the power socket device 2.

Refer again to FIG. 1. The mode selection unit 19 on the remote control device 1 is allowed to be set to be in the manual mode (M) or the automatic mode (A). When the mode selection unit 19 is set to be in the manual mode (M), the remote control device 1 is allowed to be switched (ON or OFF) by means of the power control unit 18, further wirelessly controlling the power supply to the controlled socket 20 on the power socket device 2. Furthermore, in case that the mode selection unit 19 is set to be in the automatic mode (A), the remote control device 1 is allowed to sense the brightness of light through the light sensor module 10 and makes determinations according to the light sensing result, thereby further wirelessly controlling the state of power supply in the controlled socket 20 on the power socket device 2.

Refer once again to FIG. 1. When the mode selection unit 19 is set to be in the automatic mode (A), suppose the external environment is bright, the remote control device 1 will wirelessly control the controlled socket 20 on the power socket device 2 to initiate power supply such that the electronic device connected to the controlled socket 20 (not shown) is allowed to operate so as to automatically supply power to the electronic device. Meanwhile, if the external environment is dark, the remote control device 1 will wirelessly control the controlled socket 20 on the power socket device 2 to interrupt power supply such that the electronic device connected to the controlled socket 20 stops operating in order to achieve the power saving effect.

Figure 2:
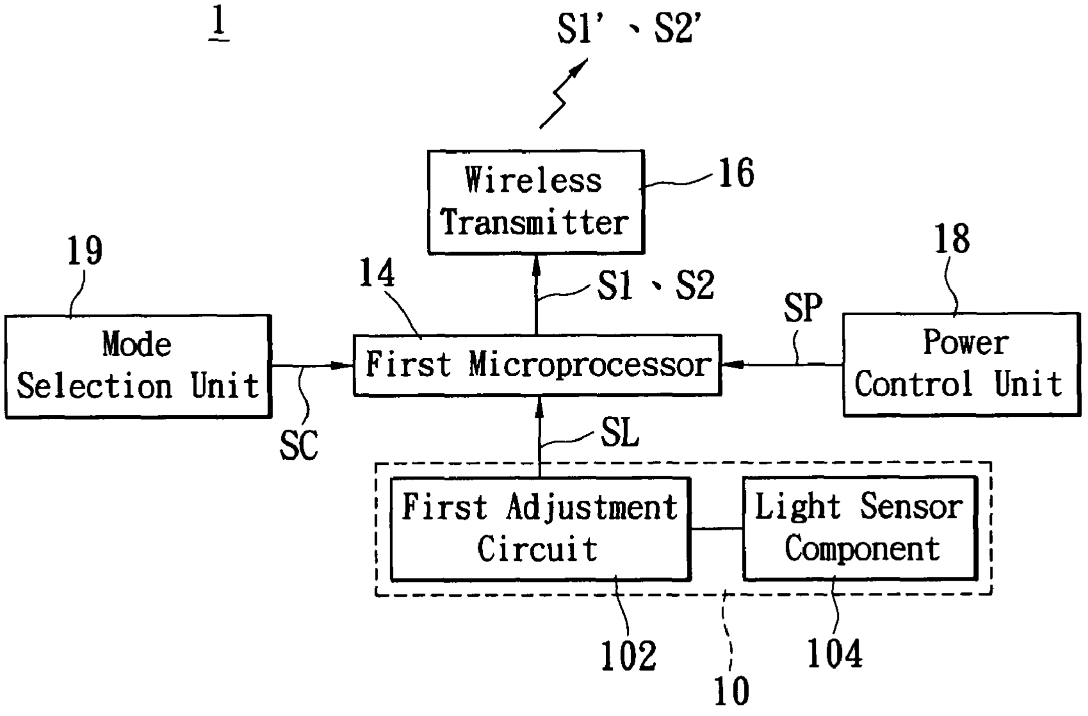
FIG. 2 is a functional block diagram of the circuitry in a remoter control device of the first embodiment according to the present invention.

In conjunction with FIG. 1, refer now to FIG. 2, wherein a functional block diagram of the circuitry in a remoter control device of the first embodiment according to the present invention is shown. As depicted in FIG. 2, the remote control device 1 comprises a light sensor module 10, a first microprocessor 14 and a wireless transmitter 16. Herein the light sensor module 10 consists of a first adjustment circuit 102 and a light sensor component 104, in which the first adjustment circuit 102 is coupled to the first microprocessor 14 and the light sensor component 104. The light sensor component 104 is used to sense the brightness of light, and the first adjustment circuit 102 is used to adjust the sensitivity of the light sensor component 104 to light, thereby further outputting a first electrical signal SL, wherein the light sensor component 104 may be a CDS photo-resistor or other sensors having equivalent features.

At the same time, the first microprocessor 14 is coupled to the light sensor module 10 in order to receive the first electrical signal SL, and outputs a first control signal S1 to the wireless transmitter 16 coupled to the first microprocessor 14 according to the first electrical signal SL. The wireless transmitter 16 encodes the first control signal S1 into the first control signal S1' of radio frequency (RF) type, and transmits the resultant first control signal S1' of RF type to the power socket device 2 located at a remote location.

Again, in conjunction with FIG. 1, reference is made to FIG. 2. The remote control device 1 further comprises a power control unit 18. The power control unit 18 may be a power switch for outputting a power control signal SP to the first microprocessor 14, and the first microprocessor 14 further outputs a second control signal S2 to the wireless transmitter 16 according to the power control signal SP. The wireless transmitter 16 encodes the second control signal S2 into the second control signal S2' of RF type, and then transmits the resultant second control signal S2' of RF type to the remote power socket device 2.

As in the above-illustrated descriptions, the power control signal SP includes a high level signal or a low level signal, in which after acquiring the power control signal SP from the power control unit 18, the first microprocessor 14 determines whether the power control signal SP is a high level signal or a low level signal, and then, according to the determination result, controls through the wireless transmitter 16 whether the controlled socket 20 on the power socket device 2 should start power supply or not.

Additionally, once more in conjunction with FIG. 1, refer to FIG. 2. The remote control device 1 also comprises a mode selection unit 19, which mode selection unit 19 outputting a selection signal SC to the first microprocessor 14 for controlling the first microprocessor 14 to carry out an automatic process so as to transmit the first control signal S1 to the wireless transmitter 16, or alternatively, to perform a manual process in order to transmit the second control signal S2 to the wireless transmitter 16.

Figure 3:
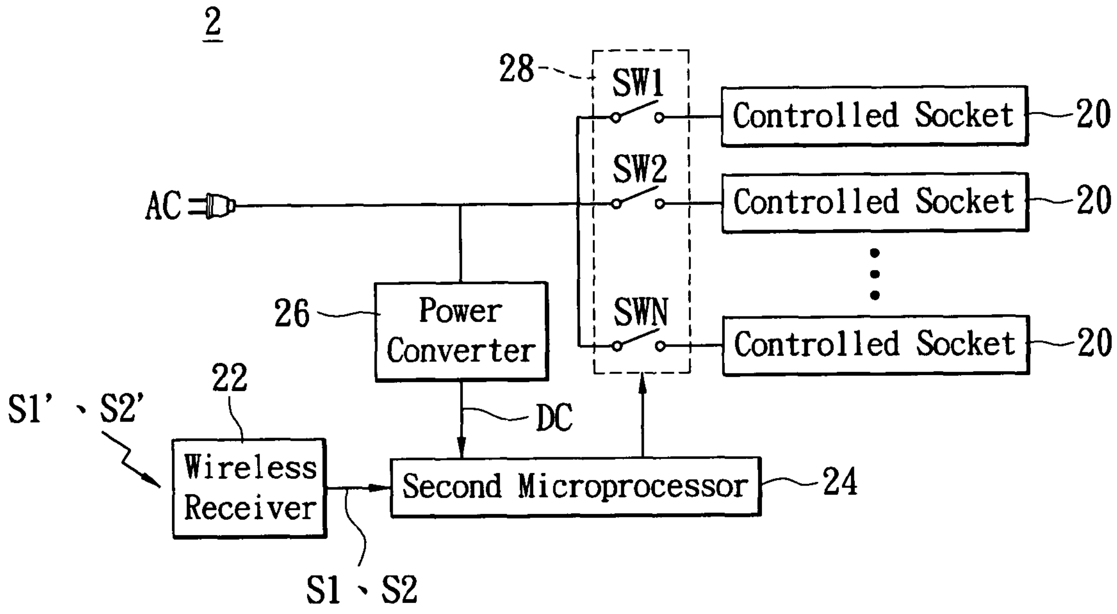
FIG. 3 is a functional block diagram of the circuitry in a power socket device of a preferred embodiment according to the present invention.

In conjunction with FIG. 2, refer now to FIG. 3. FIG. 3 is a functional block diagram of the circuitry in a power socket device of a preferred embodiment according to the present invention. As shown in FIG. 3, the power socket device 2 comprises at least one controlled socket 20, a wireless receiver 22 and a second microprocessor 24, in which the power socket device 2 may be a power extension line socket or a wall-tapped socket.

Refer again to FIG. 3, in conjunction with FIG. 2. The power socket device 2 receives the first control signal S1' of RF type from the remote control device 1 and decodes it back to the original first control signal S1. The second microprocessor 24 is coupled to the wireless receiver 22 and also coupled to at least one controlled socket 20 through a power switch module 28. The said power switch module 28 consists of at least one switch SW1, SW2, . . . SWN, in which the number of such switches is identical to the number of the controlled sockets 20 and correspondingly coupled thereto one by one. The above-said switch may be a relay or a triode for alternating current (TRIAC). As such, the second microprocessor 24 receives the first control signal S1 from the wireless receiver 22, and controls ON or OFF state in the switch SW1, SW2, . . . , SWN of the power switch module 28 according to the first control signal S1, thereby further conducting or interrupting the alternative current AC supplied to the corresponding controlled socket 20 so as to control the power supply of the corresponding controlled socket 20 to the electronic device.

Again, in conjunction with FIG. 2, refer to FIG. 3, in which the power socket device 2 further comprises a power converter 26, said power converter 26 converting the alternative current AC into a direct current DC and offering the resultant direct current DC for use of the second microprocessor 24.

Referring once again to FIGS. 2 and 3, wherein when the mode selection unit 19 on the remote control device 1 is set to be in the manual mode (M), the first microprocessor 14 executes the manual process according to the selection signal SC, determines whether the power control signal SP issued by the power control unit 18 is a high level signal or a low level signal, and then in accordance with the determination result, outputs the second control signal S2 to the wireless transmitter 16, thereby controlling the state of power supply in the controlled socket 20 on the power socket device 2 via the wireless transmitter 16.

Figure 4:
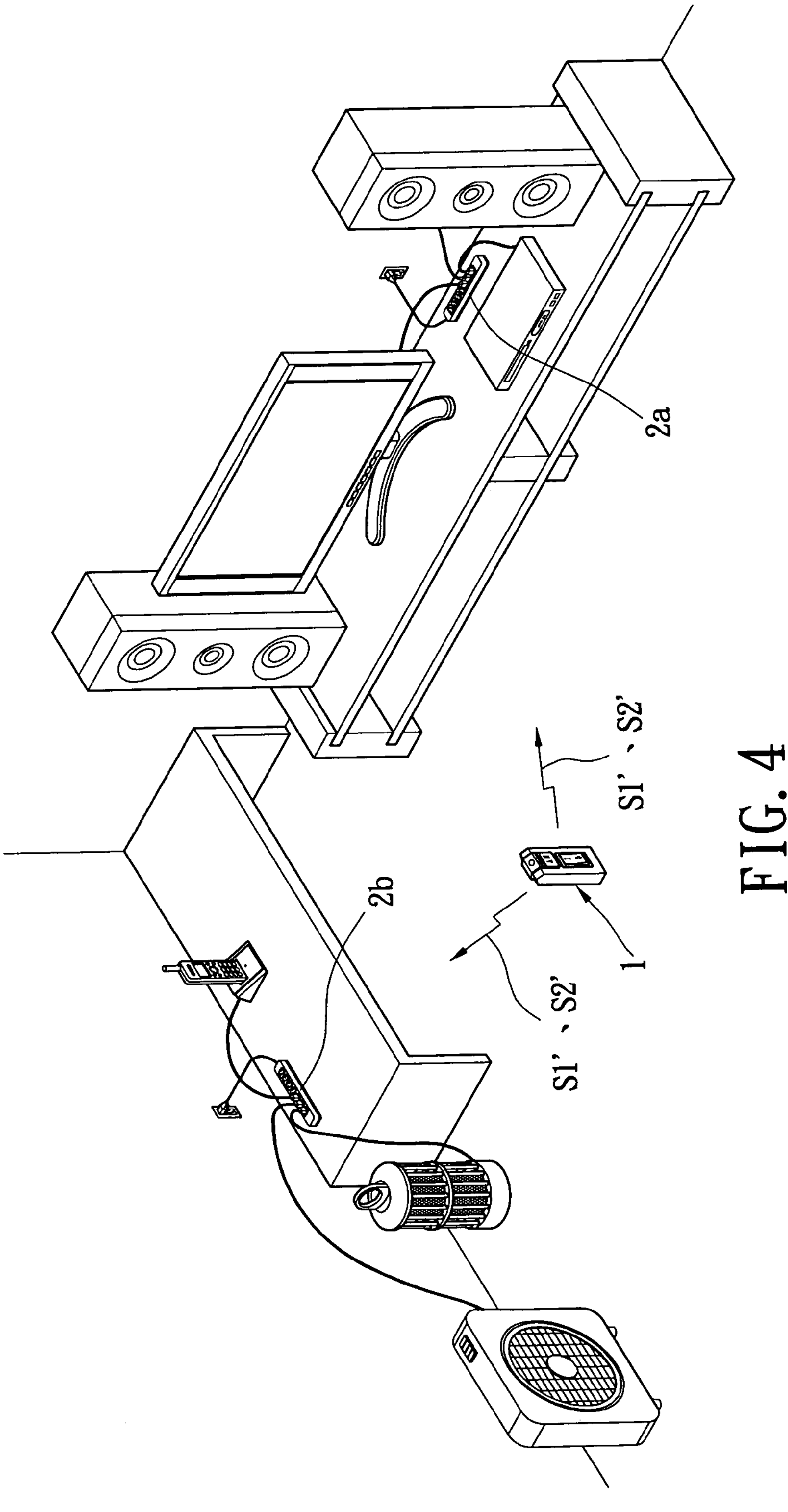
FIG. 4 is another architecture diagram of the first embodiment according to the present invention.

Besides, when the mode selection unit 19 on the remote control device 1 is set to be in the automatic mode (A), the first microprocessor 14 executes the automatic process according to the selection signal SL, determines whether the first electrical signal SL exceeds a first threshold and according to the determination result, outputs the first control signal S1 to the wireless transmitter 16. The wireless transmitter 16 controls the state of power supply in the controlled socket 20 on the power socket device. Refer now to FIG. 4, wherein another architecture diagram of the first embodiment according to the present invention is shown. As depicted in FIG. 4, the remote control device 1 may output a first control signal S1' or a second control signal S2' to a plurality of wirelessly controlled power socket device 2*a*, 2*b*, thereby simultaneously controlling the state of power supply in the controlled sockets 20 on the plurality of wirelessly controlled power socket device 2*a*, 2*b*.

Figure 5:
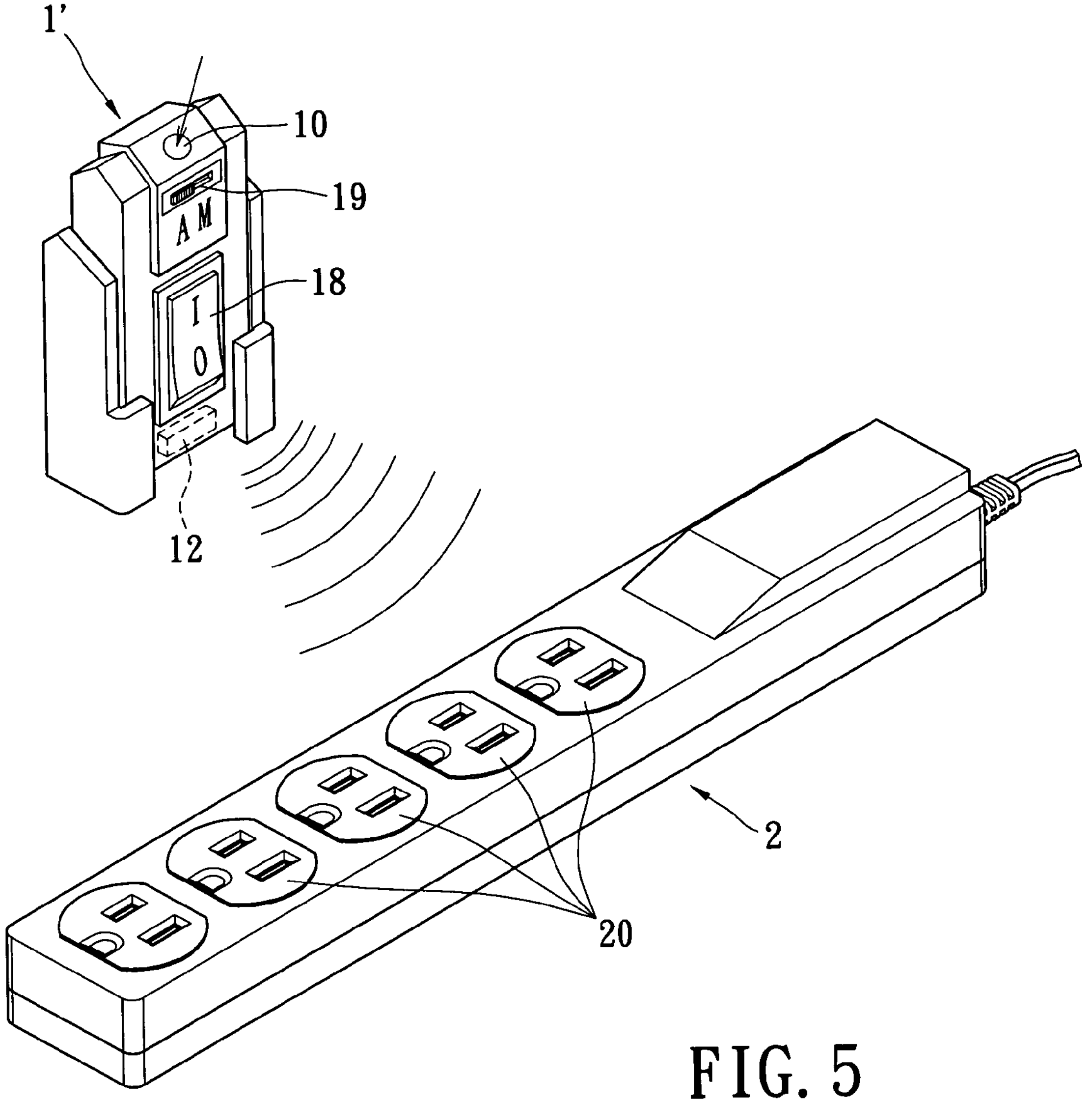
FIG. 5 is an architecture diagram of a second embodiment according to the present invention.

In conjunction with FIG. 1, refer next to FIG. 5, wherein an architecture diagram of a second embodiment according to the present invention is shown. Those components illustrated in the second embodiment of the present invention which are identical to the counterparts found in the first embodiment are marked with the identical symbols. The circuitry operation principles and achieved effects of the second embodiment and the first embodiment are the same, but the essential differences between them lie comparably in that: the remote control device 1' of the second embodiment according to the present invention further comprises a shock sensor module 12.

As depicted in FIG. 5, when the mode selection unit 19 is set to be in an automatic mode (A), the remote control device 1' is capable of sensing the brightness of light by means of the light sensor module 10 and also sensing the intensity of shock through the shock sensor module 12, makes determination according to the brightness and the intensity of shock, and then further wirelessly controls the state of power supply in the controlled socket 20 on the power socket device 2.

In case of bright environment and absence of intense shock, the remote control device 1' will wirelessly control the controlled socket 20 on the power socket device 2 such that the electronic device (not shown) connected to the controlled socket 20 is allowed to turn on and operable, thereby achieving the effect of automatic startup in the electronic device. However, suppose the external environment is dimming or tempestuous shocks occur, the remote control device 1' will wirelessly control the controlled socket 20 on the power socket device 2 to interrupt power supply function, such that the electronic device (not shown) connected to the controlled socket 20 stops operating in order to achieve the objective of power saving or prevention of any disasters possibly triggered by such strong shocks, e.g., fires caused by power line short circuit.

Figure 6:
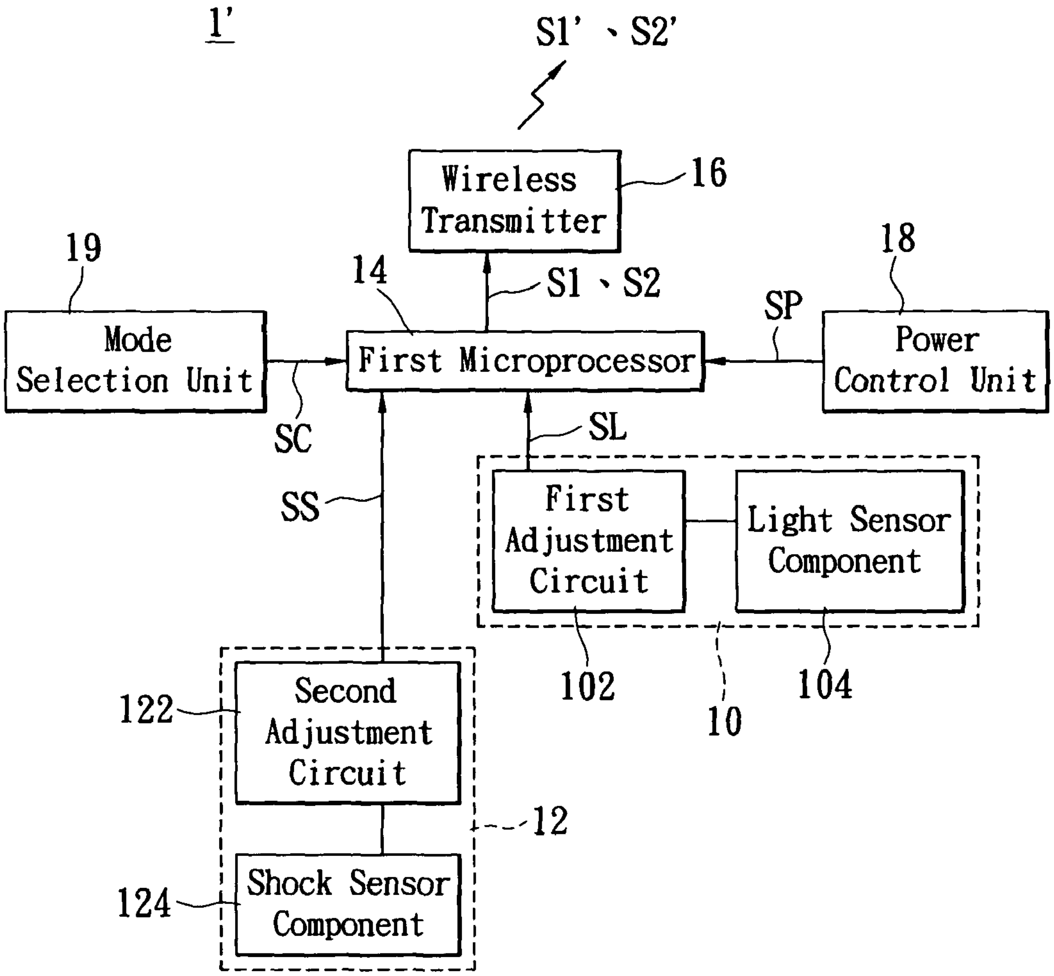
FIG. 6 is a functional block diagram of the circuitry in a remoter control device of the second embodiment according to the present invention.

In conjunction with FIG. 2, refer next to FIG. 6, wherein a functional block diagram of the circuitry in a remoter control device of the second embodiment according to the present invention is shown. As depicted in FIG. 6, the shock sensor module 12 in the remote control device 1' consists of a second adjustment circuit 122 and a shock sensor component 124, in which the second adjustment circuit 122 is coupled to the first microprocessor 14 and the shock sensor component 124. The shock sensor component 124 is used to sense the intensity of the shock, and the second adjustment circuit 122 is applied to adjust the sensitivity of the shock sensor component 124 to shock, thereby further outputting a second electrical signal SS to the first microprocessor 14.

Meanwhile, the first microprocessor 14 is coupled to the light sensor module 10 and the shock sensor module 12 for receiving the first electrical signal SL and the second electrical signal SS, and outputs the first control signal S1 to the wireless transmitter 16 coupled to the first microprocessor 14 according to the received first electrical signal SL and the second electrical signal SS.

Furthermore, when the mode selection unit 19 on the remote control device 1' is set to be in the automatic mode (A), the first microprocessor 14 executes the automatic process according to the selection signal SC, determines whether the first electrical signal SL exceeds a first threshold or else determines whether the second electrical signal SS exceeds a second threshold, and then, according to the determination result, outputs the first control signal S1 to the wireless transmitter 16.

Figure 7:
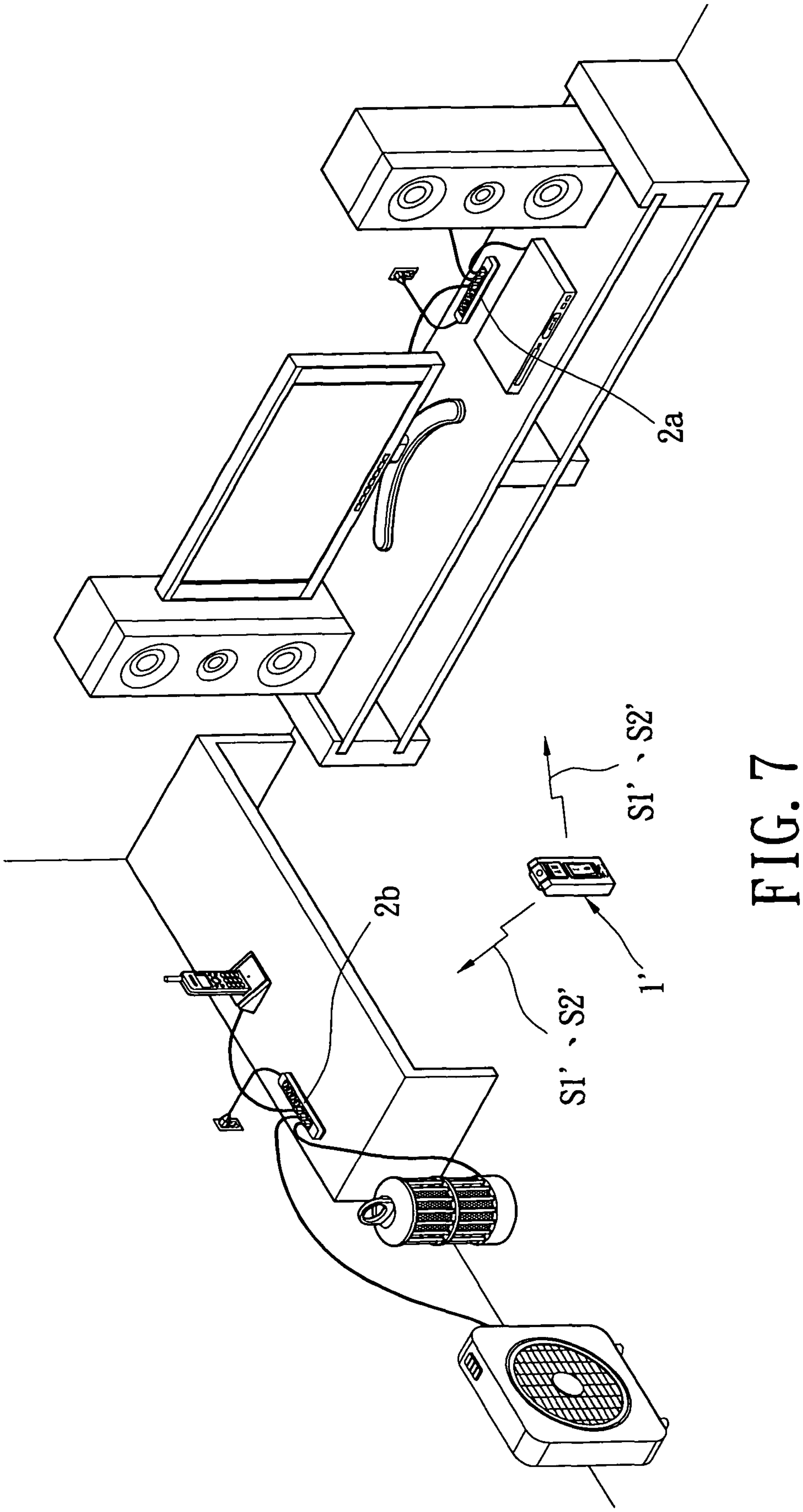
FIG. 7 is another architecture diagram of the second embodiment according to the present invention.

Refer further to FIG. 7, wherein another architecture diagram of the second embodiment according to the present invention is shown. As depicted in FIG. 7, the remote control device 1' may output a first control signal S1' or a second control signal S2' to a plurality of wirelessly controlled power socket device 2*a*, 2*b*, thereby simultaneously controlling the state of power supply in the controlled sockets 20 on the plurality of wirelessly controlled power socket device 2*a*, 2*b*.

In summary of the aforementioned descriptions, the power system with light-controlled function according to the present invention is enabled to perform power control through provision of manual control mode or automatic control mode, and when the power system is set to be in the manual mode (M), the remote control device 1' is allowed to wirelessly control, in a direct approach, the state of power supply in the controlled socket 20 on the power socket device 2.

In addition, when the power system is set to be in the automatic mode (A), the remote control device 1' is allowed to wirelessly control the state of power supply in the controlled socket 20 on the power socket device 2 by means of determining the brightness of environmental light or intensity of shock. To be more specific, suppose that the power system is set to be in the automatic mode (A), in case of bright environment and absence of intense shock, the remote control device 1' will wirelessly control the controlled socket 20 on the power socket device 2 such that the electronic device connected to the controlled socket 20 (not shown) is allowed to turn on and operable, thereby achieving the effect of automatic startup in the electronic device. However, suppose the external environment is dimming or tempestuous shocks occur, the remote control device 1' will wirelessly control the controlled socket 20 on the power socket device 2 to interrupt power supply function, such that the electronic device connected to the controlled socket 20 (not shown) stops operating in order to achieve the objective of power saving or prevention of any disasters possibly triggered by such strong shocks, e.g., fires caused by power line short circuit.

As such, the power system with light-controlled function and the control method thereof according to the preferred embodiments of the present invention is capable of providing the user with advantages such as convenience in electricity usage, power saving, power security and the like according to various conditions in connection with brightness of ambient light and environmental changes, thereby further eliminating drawbacks found in uses of conventional sockets and power extension line sockets.

The texts illustrated hereinbefore describe several preferred embodiments of the present invention; whereas the characteristics of the present invention are by no means limited thereto. All variations, alternations or modifications made by those skilled ones in the art in the field of the present invention are deemed to be encompassed by the scope of the present invention defined in the claims set forth hereunder.

What is claimed is:

1. A power system with light-controlled function, comprising:

a remote control device, comprising:

a light sensor module, which outputs a first electrical signal indicative of an ambient illumination;

a first microprocessor, which is coupled to the light sensor module, determines whether the first electrical signal exceeds a first threshold, and outputs a first control signal according to whether the first electrical signal exceeds the first threshold;

a wireless transmitter, which is coupled to the first microprocessor for transmitting the first control signal; and at least one power socket device, comprising:

at least one controlled socket;

a wireless receiver, which receives the first control signal; and a second microprocessor, which is coupled to the wireless receiver and the at least one controlled socket, for controlling a state of power supply in the at least one controlled socket according to the first control signal by causing the controlled socket not to be powered when the first electrical signal fails to exceed the first threshold.

2. The power system with light-controlled function according to claim 1, wherein the remote control device further comprises a shock sensor module, wherein the shock sensor module is coupled to the first microprocessor for sensing an intensity of a shock, and outputting a second electrical signal to the first microprocessor.

3. The power system with light-controlled function according to claim 2, wherein the first microprocessor outputs the first control signal according to generation of the first electrical signal and the second electrical signal.

4. The power system with light-controlled function according to claim 3, wherein the remote control device further comprises a power control unit, wherein the power control unit outputs a power control signal to the first microprocessor, and the first microprocessor outputs a second control signal to the wireless transmitter according to the power control signal.

5. The power system with light-controlled function according to claim 4, wherein the remote control device further comprises a mode selection unit, wherein the mode selection unit outputs a selection signal to the first microprocessor in order to control the first microprocessor to send the first control signal or the second control signal to the wireless transmitter.

6. The power system with light-controlled function according to claim 5, wherein the first microprocessor executes an automatic process in order to send the first control signal to the wireless transmitter, and executes a manual process in order to send the second control signal to the wireless transmitter.

7. The power system with light-controlled function according to claim 5, wherein the power socket device further comprises a power switch module, wherein the power switch module has at least one switch, and each switch is correspondingly coupled to a controlled socket and controlled by the first control signal or the second control signal, thereby conducting or interrupting an alternative current connected to the corresponding controlled socket.

8. The power system with light-controlled function according to claim 7, wherein the power socket device further comprises a power converter, wherein the power converter converts the alternative current into the direct current and provides the converted direct current to the second microprocessor.

9. The power system with light-controlled function according to claim 1, wherein the light sensor module further comprises a light sensor component and a first adjustment circuit, in which the first adjustment circuit is coupled to the first microprocessor and the light sensor component, wherein the first adjustment circuit is used to adjust the sensitivity of the light sensor component to light.

10. The power system with light-controlled function according to claim 9, wherein the light sensor component is a photo-resistor.

11. The power system with light-controlled function according to claim 2, wherein the shock sensor module comprises a shock sensor component and a second adjustment circuit, in which the second adjustment circuit is coupled to the first microprocessor and the shock sensor component, wherein the second adjustment circuit is used to adjust a sensitivity of the shock sensor component to shock, thereby further outputting the second electrical signal.

12. A method for wirelessly controlling a power system with light-controlled function, comprising the following steps:

generating a first electrical signal indicative of an ambient illumination of the power system;

determining whether the first electrical signal exceeds a first threshold and generating a first control signal according to whether the first electrical signal exceeds the first threshold; and wirelessly transmitting the first control signal in order to control a state of power supply in a controlled socket on a power socket device by not causing the controlled socket to be powered when the first electrical signal fails to exceed the first threshold.

13. The method for wirelessly controlling a power system with light-controlled function according to claim 12, further comprising a step of generating a second electrical signal according to an intensity of a shock.

14. The method for wirelessly controlling a power system with light-controlled function according to claim 13, further comprising a step of determining whether the second electrical exceeds a second threshold signal and generating the first control signal according to generation of the first electrical signal the second electrical signal.

15. The method for wirelessly controlling a power system with light-controlled function according to claim 14, further comprising a step of receiving a power control signal and generating a second control signal according to the power control signal.

16. The method for wirelessly controlling a power system with light-controlled function according to claim 15, after the step of receiving the power control signal, further comprising a step of receiving a selection signal and wirelessly transmitting the first control signal or the second control signal according to the selection signal, thereby controlling the state of power supply in the controlled socket on the power socket device.

* * * * *